2,732,661

PRODUCTION OF PROTEIN, LIPIDES, AND CARBOHYDRATES BY CULTURE OF ALGAE

Herman A. Spoehr and Harold W. Milner, Palo Alto, Calif., assignors to Carnegie Institution of Washington, Washington, D. C., a corporation of the United States No Drawing. Application November 14, 1949, Serial No. 127,273

6 Claims. (Cl. 47—58)

This invention relates to the utilization of algae as a source of lipides, proteins, carbohydrates, and other plant products, and has for its primary objective to produce those materials in predetermined amounts, proportions and compositions by controlled algae culture.

By the present invention, the environmental conditions under which unicellular green algae are cultivated may be so controlled as to vary the rate of growth of algae both as to cell count and weight so that conditions may be selected, for example, which will give a high yield in cell count from a comparatively brief period of photosynthesis. Furthermore, the chemical composition of the cell may be varied to give a high or a low protein content, or high or low lipide content, or a similarly variable carbohydrate content so that the algae afford a flexible source of such materials. The controls affecting the lipide content also produce a variation in the lipide constituency thus affording a greater flexibility. By the provision of these controls, the present invention thus materially enhances the usefulness of algae as an industrial raw product.

1. GENERAL CONSIDERATIONS—CONDITIONS FAVORING CELL REPRODUCTION

The process to which the present invention is directed involves cultivation of the algae in a nutrient medium in the presence of light and a sufficient supply of carbon dioxide. The nutrient medium consists of an aqueous solution of fixed nitrogen and other inorganic mineral nutrients and trace amounts of micro-nutrients.

A gas stream containing carbon dioxide is bubbled through the nutrient medium to which the inoculum has been transferred and the culture proceeds in the presence of artificial light or sunlight until the desired increase in weight of the algae is obtained.

These phenomena are well known to the plant physiologist who employs algae culture as a laboratory tool in the study of the processes of photosynthesis, respiration and biosynthesis fundamental to plant life. The object of the present invention is to adapt these processes to industrial uses for the production economically of large quantities of the three major plant constituents, proteins, lipides and carbohydrates and of other products.

Considering first conditions which are well suited for high yields of unicellular green algae in terms of increase in cell count from a brief period of synthesis, we have proceeded as follows:

*Example I.*—A nutrient medium was made up of an aqueous solution of the following nutrients in the concentrations indicated:

| Salts: | Molar concentrations |
|---|---|
| $KNO_3$ | 0.0250 |
| $MgSO_4$ | 0.0200 |
| $KH_2PO_4$ | 0.0180 |
| $FeSO_4$ | 0.000005 |

The medium also contained in solution trace amounts of the micro-nutrients, boron, copper, manganese, zinc, iron and molybdenum. These micro-nutrients were present in the water supply. In all examples of nutrient media given herein, trace amounts of these micro-nutrients are assumed to be present, in addition to the nutrients including, as indicated, fixed nitrogen and ions of magnesium, phosphate, sulfate, potassium and iron.

Two liters of the culture medium were introduced to a three-liter Fernbach flask fitted with a stopper and tubing and the assembly was sterilized followed by aseptic transfer of the inoculum. Any algae, particularly unicellular green algae, may be employed of which the genus Chlorella is typical, and in this instance the species *Chlorella pyrenoidosa* was used. Carbon dioxide was supplied as a 5% mixture of $CO_2$ in air which was led into the container under sterile conditions to bubble through the nutrient medium. The light source employed consisted of a 300-watt Mazda bulb with reflector, directed upwardly through the center of the flask with the bulb disposed 15 cm. from the culture. A temperature of approximately 25° C. was maintained by the flow of cooling water around the flask.

After fifteen days, the cultures were quickly cooled to about 2° C. and the cells were separated from the medium in a centrifuge. The sedimented cells were resuspended in a little distilled water to rinse off entrained nutrient solution, after which they were again centrifuged sharply. The cells were put immediately into a vacuum desiccator to dry at room temperature over calcium chloride. After 24 hours, the desiccant was changed and the drying in vacuum continued until the cells reached consistent weight in a matter of a few days.

The yield was 2.6 grams dry weight. An analysis showed 7.54% nitrogen and the constituents were: protein, 47.13%; lipide, 19.07%; carbohydrate, 33.80%.

The lipide was composed of about one-third fatty acids with an iodine number of 163 of which about 80% were unsaturated and with a small amount triply unsaturated. Of the remaining total lipides there was a considerable non-saponifiable fraction.

Thus the culture produced economically in about two weeks' time a substantial quantity, as compared with the starting inoculum, of plant constituents, particularly protein and lipide, of good quality.

2. FIXED NITROGEN IN THE NUTRIENT MEDIUM

The extent of depletion of fixed nitrogen in the nutrient medium as the algae take nutrients during the culture is a significant factor determining both the yield and the chemical composition of the resultant product. Thus, we have found that where the algae are cultured in a medium in which the fixed nitrogen is consistently maintained at a concentration substantially greater than .001 molar, and preferably at least .01 molar, despite such depletion, the rate of cell reproduction will be high. The formula of Example I meets that condition by its starting value of 0.0250 molar $KNO_3$ which is adequate to assure that the concentration does not fall below .001 molar during the fifteen days of photosynthesis. The upper limit, if any, as to starting nitrogen concentration depends upon the source of the nitrogen. Where, as in Example I, the fixed nitrogen is derived from nitrate, the upper limit is generally fixed only by economy of the process and we may practically use proportions as high as .025 M with nitrate nitrogen. Where, however, an ammonium salt is the source of fixed nitrogen, the upper limit is critical for good growth and should not exceed .0025 M, as substantially decreased growths are obtained where that concentration is substantially exceeded.

The concentrations of fixed nitrogen in the nutrient medium during photosynthesis also affect the chemical composition of the algae produced. In general, concentrations of fixed nitrogen high enough to favor high yields in terms of cell population also favor increased proportions of protein and carbohydrate and decreased proportion of lipide. Thus, where the concentration of fixed nitrogen is maintained well above .001 M, and preferably at least .01 M, the proportion of protein in the cells will be in the approximate range of 40% to 60% and instances as high as 75%, depending upon other conditions, including light intensity and duration of photosynthesis. The carbohydrate constituent will be present in amounts ranging roughly from 10% to 35% and lipide roughly from 20% to 25%.

Where the photosynthesis is performed in a medium containing fixed nitrogen starting and maintained at a concentration below .001 M there will be comparatively little increase in cell count and growth will be evidenced as a fattening of the cells to increase their lipide content. With adequate light intensity and sufficiently prolonged culture time, lipide proportions in instances as high as 75% or even 80% of the dry weight of the culture are obtained with correspondingly low values for protein and carbohydrate. The yield, however, will be low.

For quantity production of lipide, we preferably start the process with a fixed nitrogen value in the nutrient medium of above .001 M and maintain the concentration above that value for a sufficient period to obtain the desired cell count, by which time the residual fixed nitrogen will have fallen, by depletion, below .001 M at which value the photosynthesis is continued under suitable light intensity to obtain the desired lipide content. Highest lipide contents are obtained when the complete synthesis leaves the nutrient medium with a residual fixed nitrogen value of below .0004 M.

Thus, as Example II, the following nutrient medium was employed to obtain high yields of lipide:

|  | M |
| --- | --- |
| $NH_4H_2PO_4$ | 0.000825 |
| $(NH_4)_2HPO_4$ | 0.000715 |
| KCl | 0.0300 |
| $MgSO_4$ | 0.0100 |
| $KH_2PO_4$ | 0.0100 |
| Fe | 0.000005 |

A number of two-liter cultures were made up with this medium to which was introduced 5% $CO_2$ in nitrogen during exposure to a 200-watt Mazda lamp, 15 cm. distant, while the culture was maintained at from 20 to 22° C. The cultures were continued for different times to show comparative lipide yields as follows:

Table A

| Days Culture | 14 | 21 | 28 | 42 | 63 |
| --- | --- | --- | --- | --- | --- |
| Chlorella (dry wt.)..........g.. | 2.77 | 2.88 | 3.41 | 3.90 | 4.443 |
| Lipide proportion.......Percent.. | 54.4 | 63.4 | 67.9 | 76.5 | 79.0 |

The nitrogen concentration in this culture medium is significant. The total nitrogen concentration in both phosphates is 0.000825 M plus 2 × .000715 M, or 0.002255 M. The fixed nitrogen was depleted to below a value of 0.001 M prior to the fourteenth day so that for the remaining culture the residual fixed nitrogen was at a value conducive to high lipide growth. The rate of increase in lipide value began to fall off after the 42nd day so that the harvest might advantageously have occurred then rather than awaiting the full sixty-three-day growth.

Thus the concentration of residual fixed nitrogen is critical in its effect on the proportions of protein, lipide and carbohydrate in the product. Other environmental factors also affect these proportions, as will be referred to, but only if the critical requirements as to fixed nitrogen are satisfied as a prerequisite.

These same environmental conditions which affect the proportions of protein, lipide and carbohydrate, may also be so controlled as to effect predetermined changes in the chemical composition of the lipide constituent as to its proportions of fatty acids, unsaponifiable fraction, water soluble saponifiable products, and fat. Thus, for example, conditions controlled to increase the percentage of lipide will also increase the percentage of fatty acids in the lipide, decrease the percentage of water soluble saponification products and increase its proportion of fat. Other values are also subject to change as is summarized in the following analysis of Chlorella cultures having lipide proportions in the increasing order of approximately 23%, 33%, 63% and 76%.

Table B

ANALYSIS OF LIPIDE FRACTION OF CHLORELLA

| Analysis | Chlorella lot No. | | | |
| --- | --- | --- | --- | --- |
|  | 1 | 2 | 3 | 4 |
| Total lipide, percent of Chlorella | 23.37 | 33.17 | 62.96 | 75.51 |

COMPOSITION OF TOTAL LIPIDE

| | | | | |
| --- | --- | --- | --- | --- |
| Fatty acids, percent of lipide | 28.0 | 49.5 | 83.0 | 86.8 |
| Unsaponifiable, percent of lipide | 12.0 | 7.7 | 3.3 | 3.3 |
| Water-soluble saponification products, percent of lipide | 60.0 | 42.8 | 13.7 | 9.9 |
| Calculated fat, percent of Chlorella | 6.85 | 17.2 | 54.7 | 68.6 |

ANALYSIS OF TOTAL FATTY ACIDS

| | | | | |
| --- | --- | --- | --- | --- |
| Iodine No. (Hanus) | 163.1 | 143.8 | 143.6 | 125.3 |
| Equivalent weight | 269.5 | 273.6 | 272.7 | 274.1 |
| Palmitic acid, percent of total | 16.6 | 10.9 | 7.9 | 11.4 |
| Stearic acid, percent of total | 0.4 | 4.1 | 3.9 | 3.5 |
| $C_{16}$ unsaturated, percent of total | 29.1 | 18.3 | 27.3 | 18.0 |
| $C_{18}$ unsaturated, percent of total | 53.9 | 66.7 | 60.9 | 67.1 |

DEGREE OF UNSATURATION

| | | | | |
| --- | --- | --- | --- | --- |
| $C_{16}$ unsaturated acids | −4.1 H |  | −4.4 H |  |
| $C_{18}$ unsaturated acids | −4.5 H |  | −3.4 H |  |
| $C_{16}+C_{18}$ unsaturated acids |  | −3.6 H |  | −3.2 H |

3. ILLUMINATION

With other environmental conditions favorable, cultures can be grown well under light intensities ranging from that provided by a 25-watt lamp to full sunlight. With 25-, 40-, 60-, 75- and 100-watt lamps, the yields appear to be generally proportional to the light intensity where the process is performed in two-liter cultures as described in Example I. Increase in light intensity above 100 watts causes relatively smaller increase in yield. When employing an ammonium salt as the source of fixed nitrogen, maximum yields are obtained with 200-watt lamps, and with a nitrate source of nitrogen maximum yields are obtained from 300-watt lamps. Higher intensities from a 500-watt lamp cause a small drop in yield from the maximum. Cultures in five-gallon bottles using a nitrate source of nitrogen under natural illumination give the largest yields when exposed to direct sunlight. In all instances the light may be continuous or intermittent, comparable to day and night, with substantially the same results for the same light hours of exposure.

The composition of the culture may be varied by a variation in the light intensity. In general a lower degree of illumination favors higher protein content, assuming sufficient nitrogen is present. Table C which follows, shows the variation in protein proportions obtained from cultures for 15 days employing a gas stream of 5% $CO_2$ in nitrogen in two-liter cultures using three-liter Fernbach flasks and with an incident light source from Mazda lamps placed 15 cm. below the bottom center of the flask using a reflector. The nutrient medium was as follows:

EXAMPLE III

|  | M |
|---|---|
| $NH_4Cl$ | 0.00225 |
| KCl | 0.0300 |
| $MgSO_4$ | 0.0100 |
| $KH_2PO_4$ | 0.0100 |
| Fe | 0.000005 |

The protein percentages were as follows:

*Table C*

| Lumens | Watts | Percentage Nitrogen in Dry Cells | Approximate Protein Percentage |
|---|---|---|---|
| 270 | 25 | 9.52 | 60 |
| 465 | 40 | 9.55 | 60 |
| 835 | 60 | 8.06 | 50 |
| 1650 | 100 | 4.58 | 29 |
| 2600 | 150 | 3.08 | 19 |
| 3700 | 200 | 2.61 | 16 |

4. SOURCE OF CARBON

The algae depend for their source of carbon upon the carbon dioxide supplied to the medium. The amount of carbon dioxide favorable to photosynthesis of algae is usually 5%, as is known in the art, although we have found that it may vary from 3% to 7%, or even up to 10%. The diluent should not contain too high a percentage of oxygen but may be air or an oxygen-free gas such as nitrogen or hydrogen. Under higher light intensities slightly higher yields and higher lipide values are obtained with nitrogen than with air as the diluent.

It is entirely practicable to use crude sources of carbon dioxide such as deep well gases, washed flue gases, fermentation gases, sewage disposal plant gases and the like.

The use of a gas stream bubbling through the nutrient medium has also the effects of removing oxygen, initially present and formed during the process of photosynthesis; it agitates the medium to aid in keeping the cells in suspension.

5. DURATION OF SYNTHESIS

The duration of the photosynthesis affects both the yield and the composition of the product as is apparent, for example, from conditions above referred to in which the nutrient medium has a starting fixed nitrogen concentration at or above .001 M which drops below that figure during the photosynthesis to produce high yield of high lipide cells. The time of harvest is also a factor contributing to the yield and composition where high protein values are desired and where a nutrient medium is employed which at no time becomes depleted in fixed nitrogen below the value of .001 M.

In the presence of an abundant supply of nitrogen, such for example as with the medium of Example I employing 0.0250 M $KNO_3$ as the source of fixed nitrogen, the culture remains dark green for a period of months. Cell division virtually ceases after about two weeks. After that time the cell count does not change materially but the weight of the cells may increase by a factor of 4 or 5. This increase in weight is accompanied by a slow increase in lipide content and an increase in cell size. High lipide values will not, however, be obtained under the assumption that the fixed nitrogen concentration remains above .001 M.

To obtain economically high yields of high protein cells, we prefer to harvest the cells at about the end of the two-week period, i. e. about as soon as cell division ceases.

Changes in color of the culture during synthesis may be used as an index of changes in composition of the product. Thus, when employing a medium limited in fixed nitrogen with the objective of high lipide in high yield, the early stages of growth are accompanied by the same dark green color and cell count as in a medium with high fixed nitrogen. When cell division stops and the lipide value begins to increase, the appearance changes. The dark green color becomes lighter, gradually changing to yellow in cultures of highest lipide content. These pale cells of high lipide content are many times the size of dark green cells of low lipide content.

6. CORRELATION OF ENVIRONMENTAL FACTORS

By a correlation of the factors of fixed nitrogen concentration, light intensity, carbon dioxide concentration, and duration of synthesis, the composition of the algae can be predetermined within close values.

Thus these controls were sought to be employed to produce in sterilized media large-scale cultures having lipide contents ranging from 20% to 75% in the order of about 20%, 35%, 60% and 75% lipide. The results were as follows.

Example IV, seeking approximately 20% lipide, employed a nutrient medium composed as follows:

|  | M |
|---|---|
| $KNO_3$ | 0.0250 |
| $MgSO_4$ | 0.0200 |
| $KH_2PO_4$ | 0.0180 |
| $FeSO_4$ | 0.000005 |

These materials were dissolved in previously boiled, cooled and filtered tap water. The cultures grew in five-gallon bottles for 80 days under natural illumination in a greenhouse and were aerated with 5% $CO_2$ in air. One kilo, dry weight, the yield from about 30 cultures, was used for lipide analysis. The lipide obtained was 23.37% by analysis.

Example V seeking 35% lipide employed a nutrient medium made up as follows:

|  | M |
|---|---|
| $NH_4H_2PO_4$ | 0.000825 |
| $(NH_4)_2HPO_4$ | 0.000715 |
| KCl | 0.0300 |
| $MgSO_4$ | 0.0100 |
| $KH_2PO_4$ | 0.0100 |
| $FeCl_3$ | 0.000005 |

These materials were dissolved in water pretreated as for example IV. Seven cultures, 15 liters each in five-gallon bottles were grown outdoors, near a north wall, for seventeen days. 5% $CO_2$ in air was bubbled through the cultures. The yield from seven cultures was 66.5 grams dry weight. The content of lipide by analysis was 33.17%.

Example VI having an objective of 60% lipide, employed the same nutrient medium as in Example V and the conditions of growth were the same except that the time of growth was 83 days. The yield was 113 grams dry weight from six 15-liter cultures. The lipide content was 62.96% by analysis.

Example VII, seeking 75% lipide, employed conditions known to produce cells of very high lipide content. The nutrient medium was the same as in Examples V and VI. The gas stream, however, was 5% $CO_2$ in nitrogen. Ten cultures, each two liters in volume, were grown in Fernbach flasks. Each culture was illuminated continuously for 75 days by a 200-watt Mazda lamp placed 15 cm. below the flask. A water bath kept the temperature of the culture at 21 to 23° C. The ten cultures yielded 51.6 grams dry weight; the lipide proportion by analysis was 75.51%.

The composition of these several cultures is indicated by Table D.

Table D
COMPOSITION OF CHLORELLA

| Examples | Found by Analysis | | | | Calculated | | | Lipide By Analysis, percent |
|---|---|---|---|---|---|---|---|---|
| | C, percent | H, percent | N, percent | Ash, percent | Carbo-hy-drate, percent | Pro-tein, percent | Lip-ide, percent | |
| IV | 48.64 | 6.88 | 6.80 | 7.71 | 33.4 | 46.4 | 20.2 | 23.37 |
| V | 53.46 | 7.66 | 4.15 | 4.97 | 37.5 | 27.3 | 35.2 | 33.17 |
| VI | 60.95 | 8.80 | 2.01 | 4.69 | 23.5 | 13.1 | 63.4 | 62.96 |
| VII | 65.58 | 9.43 | 1.23 | 3.49 | 15.0 | 7.9 | 77.1 | 75.51 |

Analyses of the lipide fractions of these examples are given in Table B supra.

The variations in proportions of carbohydrate and protein are given as well as the variations in proportions of lipide. These examples were selected with a view toward obtaining predetermined lipide contents with whatever carbohydrate and protein proportions incidentally followed. Manifestly the conditions may be selected as well from the point of view of predetermining the protein or carbohydrate proportions.

The fractions of any of these values may be isolated, if desired, from the dried cells by known methods of extraction.

The same principles apply to environmental controls for selecting the proportions of protein, carbohydrate and lipide, and the composition of the lipide from the culture of unicellular algae generically, and particularly all unicellular green algae, and our invention is not to be limited to the genus Chlorella or the species *Chlorella pyrenoidosa* except as the appended claims require. As further examples of such algae which we may use we include diatoms, *Stichococcus bacillaris*, *Chlorella vulgaris* and other species.

In commercial practice it may be desirable to use culture volumes considerably greater than those herein given. The controls described and the numerical values given with respect to fixed nitrogen concentrations, carbon dioxide concentration and duration of synthesis will, however, apply as well. The control of light intensity involves differences in volume, shape of vessel, etc. which affect opacity and may change the specific values for optimum light intensities.

We claim:

1. In the method of producing protein, carbohydrate and lipid by cultivating green algae in a nutrient medium in the presence of light and carbon dioxide, the step of enhancing the percentage dry weight of lipide in the culture by controlling the nutrient medium to maintain a concentration of soluble fixed nitrogen constantly at least .001 molar until the desired cell count is obtained and thereafter continuing the cultivation in a medium having a fixed nitrogen concentration below .001 molar.

2. In the method of producing protein, carbohydrate and lipide by cultivating green algae in a nutrient medium in the presence of light and carbon dioxide, the step of enhancing the percentage dry weight of lipide in the culture by commencing the cultivation with a concentration of soluble fixed nitrogen in the nutrient medium of approximately .00225 molar and continuing the cultivation until the culture progresses through the color stages of dark green, light green to pale yellow.

3. In the method of producing protein, carbohydrate and lipide by cultivating green algae in a nutrient medium in the presence of light and carbon dioxide, the step of enhancing the percentage dry weight of lipide in the culture by performing the cultivation in a nutrient medium having a concentration of fixed nitrogen derived from a salt selected from the group consisting of nitrates and ammonium salts diminishing from an initial concentration of about .00225 molar to a final concentration below .001 molar.

4. In the method of producing protein, carbohydrate and lipide by cultivating green algae in a nutrient medium in the presence of light and carbon dioxide, the steps of maintaining the culture in a liberally inoculated nutrient medium containing at least .001 molar fixed nitrogen for a period of approximately two weeks and thereafter maintaining the culture in a medium having a soluble fixed nitrogen concentration below .001 molar until the desired lipide proportion is obtained.

5. In the method of producing protein, carbohydrate and lipide by cultivating green algae in a nutrient medium in the presence of light and carbon dioxide, the steps of maintaining the culture in a liberally inoculated nutrient medium containing fixed nitrogen derived from a salt selected from the group consisting of nitrates and ammonium salts and containing at least .001 molar fixed nitrogen for a period of approximately two weeks and thereafter maintaining the culture in a medium having a soluble fixed nitrogen concentration below .001 molar until the desired lipide proportion is obtained.

6. In a method of producing protein, carbohydrate and lipide by cultivating algae in a nutrient medium in the presence of light and carbon dioxide, the step of increasing the proportion of lipide to protein and carbohydrate by decreasing the nitrogen concentration in the medium substantially below .001 molar only after about two weeks growth of the algae.

References Cited in the file of this patent

UNITED STATES PATENTS

| 2,007,479 | Salles et al. | July 9, 1935 |
| 2,346,011 | Damm | Apr. 4, 1944 |

FOREIGN PATENTS

| 886,719 | France | July 12, 1943 |

OTHER REFERENCES

Ludwig: Am. J. Bot., vol. 25, pp. 443–458 (June 1938).

Ludwig: Chemical Abstracts, vol. 32, col. 8481 (1938).

Pratt: Am. J. Bot., vol. 27, pp. 431–436 (June 1940).

Chu: Chemical Abstracts, vol. 38, col. 2996 (1944).

Myers: Plant Physiol., vol. 19, No. 4, pp. 579–589 (October 1944).

Myers: J. Gen. Physiol., vol. 28, No. 2, pp. 103–112 (November 20, 1944).

Spoehr: Yearbook 45, Carnegie Inst. of Wash., pp. 99, 100, 101, 109, 110, 111 (1946).

Von Witsch, Biol. Zentr., vol. 67, No. 1/2, pp. 95–100, pub. before September 28, 1948.